United States Patent [19]

Arita et al.

[11] Patent Number: 5,300,602
[45] Date of Patent: Apr. 5, 1994

[54] PROCESS FOR PRODUCING WATER-SOLUBLE POLYMER AND WATER-SOLUBLE POLYMER

[75] Inventors: Yoshihiro Arita, Osaka; Kiyoshi Kawamura, Hyogo; Kenta Kanaida, Osaka, all of Japan

[73] Assignee: Nippon Shokubai Co., Ltd., Osaka, Japan

[21] Appl. No.: 38,199

[22] Filed: Mar. 26, 1993

[30] Foreign Application Priority Data

Mar. 30, 1992 [JP] Japan .................................. 4-074720
Apr. 22, 1992 [JP] Japan .................................. 4-103273
May 18, 1992 [JP] Japan .................................. 4-125117

[51] Int. Cl.$^5$ ........................................... C08F 226/06
[52] U.S. Cl. ..................................... 526/260; 524/808; 524/549
[58] Field of Search ............... 526/260; 524/808, 549

[56] References Cited

U.S. PATENT DOCUMENTS

| | | | |
|---|---|---|---|
| 3,996,237 | 12/1976 | Tomalia | 526/260 X |
| 4,147,674 | 4/1979 | Vasta | 526/260 X |
| 4,357,464 | 11/1982 | Tomalia et al. | 578/481 |
| 4,508,869 | 4/1985 | Keskey et al. | 524/808 |

FOREIGN PATENT DOCUMENTS

| | | |
|---|---|---|
| 0489941 | 6/1992 | European Pat. Off. |
| 47-27241 | 10/1972 | Japan . |
| 54-41940 | 4/1979 | Japan . |
| 55-18469 | 5/1980 | Japan . |
| 55-164244 | 12/1980 | Japan . |
| 63-48884 | 10/1988 | Japan . |
| 2-99537 | 4/1990 | Japan . |

Primary Examiner—Joseph L. Schofer
Assistant Examiner—Mark Nagumo
Attorney, Agent, or Firm—Lowe, Price, LeBlanc & Becker

[57] ABSTRACT

A 2-oxazoline group-containing water-soluble polymer in which the residual amount of an oxazoline monomer has been reduced is produced. An acrylic ester is copolymerized during the polymerization reaction of an addition-polymerizable oxazoline.

3 Claims, No Drawings

PROCESS FOR PRODUCING WATER-SOLUBLE POLYMER AND WATER-SOLUBLE POLYMER

BACKGROUND OF THE INVENTION

The present invention relates to a process for producing a water-soluble polymer. In further detail, the invention relates to a process for producing a 2-oxazoline group-containing water-soluble polymer useful as a crosslinking agent for an aqueous resin so that the residual amount of an addition-polymerizable oxazoline (which may be referred to as an oxazoline group-containing monomer or an oxazoline monomer) reduces. This invention also relates to a water-soluble polymer having both of the oxazoline group and a polyethylene glycol chain on the side chain.

In the radical polymerization, there have been known various kinds of processes to reduce the amount of residual monomers. In general, a process to remove residual monomers by vacuum distillation, steam distillation and so forth and a process comprising further addition of a polymerization initiator at the second half of a polymerization reaction have been known.

Also, as another process, a process to convert residual monomers into other chemical substances by a chemical reaction has been known. For example, there has been disclosed in U.S. Pat. No. 4,357,464 a process to reduce an amount of residual 2-isopropenyl-2-oxazoline by a reaction of the polymer solution with an acidic and nucleophilic compound such as sulfur dioxide gas, hydrogen sulfide gas, or sodium hydrogen sulfite and the like.

The removing process by distillation is limited to a monomer having a relatively low boiling point or being capable of azeotropically boiling with a solvent and it is hard to apply to a monomer having a high boiling point such as an addition-polymerizable oxazoline.

The process comprising further addition of a polymerization initiator as well as the process comprising reduction by a chemical reaction are not preferred because the processes leave impurities in the polymer solution, which affect badly on preservation stability and water resistance when the polymer is used as a part of coatings, adhesives and so forth.

SUMMARY OF THE INVENTION

It is an object of the present invention to provide a process for producing a water-soluble polymer, which does not accompany invasion of impurities and results in reduction of the amount of residual oxazoline monomers by carrying out only a polymerization reaction. The object of the present invention is also to provide an water-soluble polymer having both of the oxazoline group and a polyethylene glycol chain on the side chain, which can be produced by the above procedure.

To solve the aforementioned object, the present invention provides a process for producing a water-soluble polymer containing a 2-oxazoline group, comprising carrying out a polymerization reaction of a monomer component containing an addition-polymerizable oxazoline. The process is characterized by that said monomer component further contains an acrylic ester. Hereinafter, the "monomer component" is referred to as "monomer mixture".

To solve the aforementioned object, this invention provides a water-soluble polymer (i) which contains both of an oxazoline group and a polyethylene glycol chain in the side chain. This polymer (i) is a polymer obtained by polymerizing a monomer mixture. This monomer mixture is composed of 1 to 50% by weight of an addition-polymerizable oxazoline, 40 to 99% by weight of an unsubstituted or alkoxy group-substituted polyethylene glycol acrylate and 0 to 59% by weight of a monomer ($\alpha$) other than the aforementioned and contains a hydrophilic monomer in an amount of 50% by weight and more.

To solve the aforementioned object, this invention also provides an water-soluble polymer (ii) which contains both of an oxazoline group and a polyethylene glycol chain in the side chain. This polymer (ii) is a polymer obtained by polymerizing a monomer mixture. This monomer mixture is composed of 1 to 505 by weight of an addition-polymerizable oxazoline, 40 to 98% by weight of an unsubstituted or alkoxy group-substituted polyethylene glycol methacrylate, 1 to 59% by weight of an acrylic ester and 0 to 58% by weight of a monomer ($\beta$) other than the aforementioned and contains a hydrophilic monomer in an amount of 50% by weight or more.

Each of the above water-soluble polymers (i) and (ii) contains both of a pendant oxazoline group and a pendant polyethylene glycol chain.

The 2-oxazoline group is a monovalent organic group represented by the following general formula (I).

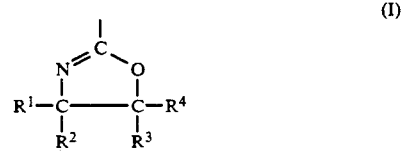

(I)

wherein $R^1$, $R^2$, $R^3$ and $R^4$ independently denote a hydrogen atom, halogen atom, an alkyl group, aralkyl, a phenyl, or substituted phenyl.

The 2-oxazoline group-containing water-soluble polymer obtained from the present invention is made by polymerizing an addition-polymerizable oxazoline (a) and an acrylic ester (b), if necessary with at least one kind of other monomers (c).

The addition-polymerizable oxazoline (a) in the present invention is represented by the following general formula (II).

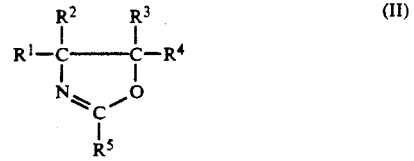

(II)

wherein $R^1$, $R^2$, $R^3$ and $R^4$ independently denote a hydrogen atom, a halogen atom, an alkyl group, an aralkyl group, a phenyl group, or a substituted phenyl group, and $R^5$ denotes a noncyclic organic group having an unsaturated bond reactive in addition-polymerization.

Practical examples of the addition-polymerizable oxazoline (a) are 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. One kind or a mixture of two or more kinds of compounds selected from the above group can be used. Among them, 2-isopropenyl-2-oxazoline is most suitable because of its industrial availability.

Although an amount for use of the addition-polymerizable oxazoline (a) is not especially limited, a preferable amount is 5% by weight or more in the monomer mixture which is used in obtaining a 2-oxazoline group-containing water-soluble polymer. If the amount of the addition-polymerizable oxazoline (a) is less than 5% by weight, curing degree is insufficient in the case where the water-soluble polymer is used as a crosslinking agent for an aqueous resin, and the durability and water resistance of a cured product led from the water-soluble polymer tends to be damaged. An upper limit of the amount for use of addition-polymerizable oxazoline (a) in the aforementioned monomer mixture is a value to get surely a minimum amount of the using acrylic ester (b), that is 95.25% by weight.

The acrylic ester (b) in this invention is not especially limited as far as it has not any functional group reactive with the 2-oxazoline group and is capable of copolymerizing with the addition-polymerizable oxazoline (a), and it is such as usually obtained from an esterification reaction of acrylic acid with monovalent or polyvalent alcohols or phenols. Practical examples are methyl acrylate, ethyl acrylate, butyl acrylate, 2-ethylhexyl acrylate, stearyl acrylate, perfluoroalkylethyl acrylate, phenyl acrylate, 2-hydroxylethyl acrylate, 2-aminoethyl acrylate and its salt, and methoxypolyethylene glycol acrylate, monoesters between acrylic acid and polyethylene glycol, and the like; one kind or a mixture of two or more kinds of these compounds can be used Although an amount for use of the acrylic ester (b) is not especially limited, a preferable amount is 5 parts by weight or more based on 100 parts by weight of the addition-polymerizable oxazoline (a). If it is less than 5 parts by weight, the effect to reduce a residual amount of the addition-polymerizable oxazoline (a) becomes lower. Furthermore, an upper limit of the using acrylic ester (b) is not especially limited and, as far as a forming polymer has solubility in water, it does not matter even if the amount of acrylic ester (b) is very large to the addition-polymerizable oxazoline (a).

An amount for use of the acrylic ester (b) is preferably in a range of from 0.25 to 95.0% by weight in the monomer mixture used in obtaining the 2-oxazoline group-containing water-soluble polymer, if a using amount range of the addition-polymerizable oxazoline (a) is considered.

The other monomer (c) used in case of necessity in this invention is not especially limited as far as it is a monomer capable of copolymerizing with the addition-polymerizable oxazoline (a). Practical examples are methacrylic esters such as methyl methacrylate, butyl methacrylate, 2-ethylhexyl methacrylate, 2-hydroxyethyl methacrylate, methoxypolyethylene glycol methacrylate, monoesters between methacrylic acid and polyethylene glycol, 2-aminoethyl methacrylate and its salt, and the like; salts of (meth)acrylic acid such as sodium (meth) acrylate, ammonium (meth)acrylic acid and the like; unsaturated nitriles such as (meth)acrylonitrile and the like; unsaturated amides such as (meth)acrylamide, N-methylol (meth)acrylamide, N-(2-hydroxyethyl) (meth)acrylamide and the like; vinyl esters such as vinyl acetate, vinyl propionate and the like; vinyl ethers such as methyl vinyl ether, ethyl vinyl ether and the like; α-olefins such as ethylene, propylene and the like; halogen-containing α, β-unsaturated monomers such as vinyl chloride, vinylidene chloride, vinyl fluoride and the like; α, β-unsaturated aromatic monomers such as styrene, α-methylstyrene, sodium styrenesulfonate and the like. One kind or a mixture of two or more kinds of these compounds can be used.

Among these monomers (c), although the salts of acrylic acid such as sodium acrylate and ammonium acrylate are acryl-based monomers, they are distinct from the aforementioned acrylic esters (b) because they have no reducing effect upon the residual amount of an oxazoline monomer which the acrylic esters have. In the case of using the monomer (c) according to the process of this invention, the proportion of the monomer (c) is preferably 94.75% by weight or less upon considering a lower limited value on the amounts for use of the addition-polymerizable oxazoline (a) and acrylic ester (b).

To provide water solubility to the 2-oxazoline group-containing polymer, the proportion of a hydrophilic monomer in a monomer mixture is 50% by weight or more, preferably 70% by weight or more. The hydrophilic monomer is, for example, an addition-polymerizable oxazoline (a); a part of monomers in the group of acrylic esters (b) such as 2-hydroxylethyl acrylate, methoxypolyethylene glycol acrylate, monoesters between acrylic acid and polyethylene glycol, 2-aminoethyl acrylate and its salt, and the like; and a part of monomers in the group of monomers (c) such as 2-hydroxylethyl methacrylate, methoxypolyethylene glycol methacrylate, monoesters between methacrylic acid and polyethylene glycol, 2-aminoethyl methacrylate and its salt, sodium (meth)acrylate, ammonium (meth)acrylate, (meth)acrylonitrile, (meth)acrylamide, N-methylol (meth) acrylamide, N-(2-hydroxyethyl) (meth)acrylamide, sodium styrenesulfonate and the like.

By using a monomer having high solubility in water among these hydrophilic monomers, for example, a monomer having a polyethylene glycol chain such as methoxypolyethylene glycol (meth)acrylate, a monoester between (meth)acrylic acid and polyethylene glycol, and the like, the polymerization concentration in producing a 2-oxazoline group-containing water-soluble polymer, that is the monomer concentration in a reaction solution and the concentration of an oxazoline group-containing water-soluble polymer in a reaction mixture, can be raised. Accordingly, efficiency such as production, transportation and storage of a polymer can be raised.

In the present invention, a 2-oxazoline group-containing water-soluble polymer is produced by carrying out a solution polymerization reaction of an addition-polymerizable oxazoline (a), an acrylic ester (b) and, if necessary, at least one kind of other monomers (c) in an aqueous medium, according to a polymerization process hitherto-known in public. The aqueous medium used is not especially limited as far as it is water or a mixture of water and an organic solvent mixable with water. The organic solvent is, for example, methanol, ethanol, propanol, isopropanol, butanol, tertiary-butanol, ethylene glycol, ethylene glycol monomethyl ether, ethylene glycol monobutyl ether, diethylene glycol, acetone, methyl ethyl ketone and the like. One kind or more of these compounds are used. It is preferred to use solely water as the aqueous medium.

The solution polymerization in an aqueous medium is carried out, for example, by using an initiator such as an azo type, a persulfate type or a peroxide type compound, introducing a nitrogen gas, and warming and stirring at a temperature of 20° to 150° C. for 1 to 24 hours. The monomer mixture may be charged at one time at an initial stage into a reaction vessel or introduced by dropping or other stepwise adding. The polymerization initiator may be charged at one time at a initial stage into a reaction vessel or introduced by dropping or other stepwise adding.

By carrying out a polymerization reaction as described above, the 2-oxazoline group-containing water-soluble polymer is produced in a state where it is dissolved in an aqueous medium. This polymer may be used in this state or in a solid state obtained by removing volatile components, as occasion demands. Since the addition-polymerizable oxazoline has generally a high boiling point, it can not be removed by a process to remove volatile components, however, because a residual amount of the addition-polymerizable oxazoline in a polymer obtained from the present invention is small, preservation stability of the polymer solution is good and, when used as a component of coatings, adhesives and so forth, the polymer has such an advantage as it does not badly affect upon performance such as the preservation stability and water resistance.

The water-soluble polymer (i) has a structure, in which units of the addition-polymerizable oxazoline (a), unsubstituted or alkoxy group-substituted polyethylene glycol acrylate and a monomer ($\alpha$) other than these monomers formed by undergoing a radical polymerization reaction of the addition-polymerizable oxazoline (a), unsubstituted or alkoxy group-substituted polyethylene glycol acrylate and the monomer ($\alpha$) are irregularly combined in the same proportion as that in the monomer composition of a monomer mixture used for the polymerization. Proportions of the addition-polymerizable oxazoline (a), unsubstituted or alkoxy group-substituted polyethylene glycol acrylate and the monomer ($\alpha$) are, respectively, 1 to 50% by weight, 40 to 99% by weight and 0 to 59% by weight, preferably 5 to 40% by weight, 40 to 95% by weight and 0 to 55% by weight. If the addition-polymerizable oxazoline (a) is lower than the range, there may be a problem of decreasing reactivity and adhesion, and if it exceeds the range, because the solution viscosity becomes high, there may be a problem that the concentration of nonvolatile components can not be raised. If the unsubstituted or alkoxy group-substituted polyethylene glycol acrylate is lower than the range, there may be a problem of decreasing hydrophilicity of the polymer and, if it exceeds the range, a minimum amount of the addition-polymerizable oxazoline (a) can not be secured. If the monomer ($\alpha$) exceeds the range, an minimum amount of either the addition-polymerizable oxazoline (a) or the unsubstituted or alkoxy group-substituted polyethylene glycol acrylate can not be secured. The unsubstituted or alkoxy group-substituted polyethylene glycol acrylate is a kind of the acrylic monoester (b) and it is at least one kind selected from the one which has a structure of an ester formed between acrylic acid and an ethylene glycol polymer having 2 to 50 monomer units and the one which has a structure of an ester formed between acrylic acid and an ethylene glycol polymer having 2 to 50 monomer units substituted with an alkoxy group of carbon number 1 to 8. The monomer ($\alpha$) is one selected from the acrylic ester (b) other than unsubstituted or alkoxy group-substituted polyethylene glycol acrylate and the monomer (c).

The water-soluble polymer (ii) has a structure, in which units of the addition-polymerizable oxazoline (a), unsubstituted or alkoxy group-substituted polyethylene glycol methacrylate, acrylic ester (b) and a monomer ($\beta$) other than these monomers formed by undergoing a radical polymerization reaction of the addition-polymerizable oxazoline, unsubstituted or alkoxy group-substituted polyethylene glycol methacrylate, acrylic ester and monomer ($\beta$) are irregularly combined in the same proportion as that in the monomer composition of a monomer mixture used for the polymerization. Proportions of the addition-polymerizable oxazoline (a), unsubstituted or alkoxy group-substituted polyethylene glycol methacrylate, acrylic ester (b) and monomer ($\beta$) are, respectively, 1 to 50% by weight, 40 to 98% by weight, 1 to 59% by weight and 0 to 59% by weight, preferably 5 to 40% by weight, 40 to 95% by weight, 5 to 55% by weight and 0 to 50% by weight. If the addition-polymerizable oxazoline (a) is lower than the range, there may be a problem of decreasing reactivity and adhesion, and if it exceeds the range, because the solution viscosity becomes high, there may be a problem that the concentration of nonvolatile components can not be raised. If the unsubstituted or alkoxy group-substituted polyethylene glycol methacrylate is lower than the range, there may be a problem of decreasing hydrophilicity of the polymer and, if it exceeds the range, a minimum amount of the addition-polymerizable oxazoline (a) can not be secured. If acrylic ester (b) is lower than the range, there may be a problem that residual oxazoline monomer can not be lowered, if it exceeds the range, an minimum amount of either the addition-polymerizable oxazoline (a) or the unsubstituted or alkoxy group-substituted polyethylene glycol methacrylate can not be secured. If the monomer ($\beta$) exceeds the range, a minimum amount of any one of the three polymerizable monomers described above can not be secured. The unsubstituted or alkoxy group-substituted polyethylene glycol methacrylate is a kind of the monomer (c) and it is at least one kind selected from the one which has a structure of an ester between methacrylic acid and an ethylene glycol polymer having 2 to 50 monomer units and the one which has a structure of an ester between acrylic acid and an ethylene glycol polymer having 2 to 50 monomer units substituted with an alkoxy group of carbon number 1 to 8. The monomer ($\beta$) is an above-described monomer (c) other than unsubstituted or alkoxy group-substituted polyethylene glycol methacrylate.

If the process of this invention is used to produce the water-soluble polymers (i) and (ii), because the acrylic ester (b) is copolymerized, the water-soluble polymers (i) and (ii) in which the residual amount of the oxazoline monomer is small can be obtained. The water-soluble polymers (i) and (ii) contain a hydrophilic monomer unit in 50% by weight or more and, because of having both of an oxazoline group and a polyethylene glycol chain on the side chain, they have solubility in water.

The water-soluble polymers (i) and (ii) have, for example, an weight-average molecular weight of from 1,000 to 100,000, preferably that of from 3,000 to 50,000. If the weight-average molecular weight is lower than the range, the reactivity and adhesion may decrease. If it exceeds the range, because the solution viscosity becomes high, the concentration of nonvolatile components may not be raised.

By copolymerizing with an acrylic ester in polymerizing an addition-polymerizable oxazoline, a water-soluble polymer in which a residual amount of the oxazoline monomer is reduced is obtained compared with a case of not copolymerizing with an acrylic ester.

Since the water-soluble polymers (i) and (ii) of this invention are such as described above, they have both of properties such as reactivity and adhesion which the oxazoline group has and those such as hydrophilicity, anti-electrostaticity, and softness which the polyethylene glycol chain has.

The production process of this invention is useful as a process to obtain a water-soluble polymer in which a residual amount of the oxazoline monomer has been reduced.

Since the water-soluble polymers (i) and (ii) of this invention have both of the oxazoline group and the polyethylene glycol chain on the side chain, they have the reactivity and adhesiveness which the oxazoline group has as well as the hydrophilicity, anti-electrostaticity and softness which the polyethylene glycol chain has.

DESCRIPTION OF THE PREFERRED EMBODIMENTS

Hereinafter, the present invention is practically explained by the examples, but it is not limited by the undermentioned examples. Furthermore, unless otherwise stated, "%" and "part" denote "% by weight" and "part by weight", respectively.

The amount of residual monomers is quantitatively determined by gas chromatography under the following conditions.

Column: which was prepared by filling Thermon-100 (Gasukuro Kogyo kabusikikaisha, His present name is GL Sciences Co. Ltd.) in a 2 m glass column.

Detector: a hydrogen flame ionization detector (FID).

Injection temperature: 200° C.
Detector temperature: 250° C.
Column temperature: 100° C.

Diluting solvent: dimethyl sulfoxide, in which diethylene glycol diethyl ether was contained in 5188 ppm as an internal standard substance.

Method for preparing a sample: dilute about 20 times by the above-described solvent, 1 microliter of which was injected.

It was confirmed by infrared absorption spectrum measurements that the 2-oxazoline group exists in the water-soluble polymers produced from the below-described examples. For these measurements, a Fourier transform infrared spectrometer (FT-IR) FTS-45 made by Nippon Bio-Rad Laboratories was used and the sample used was prepared by coating a polymer solution on a zinc sulfide window for IR and vacuum-drying it at room temperature. Since the absorption by a carbon-nitrogen double bond in the 2-oxazoline group strongly appears in a wave number region of 1655 to 1657 cm$^{-1}$, it was examined by absorption in the wave number region.

EXAMPLE 1

(Productive Example of an Oxazoline Group-Containing Water-Soluble Polymer)

Into a flask equipped with a stirrer, reflux condenser, nitrogen-introducing tube, dropping funnel and thermometer were charged 179 parts of deionized water and 1 part of V-50 (2,2'-azobis(2-amizinopropane) dihydrochloride, that is a polymerization initiator made by Wako Pure Chemical Industries, Ltd.) and the obtained mixture was heated to 60° C. with introducing nitrogen gas slowly. Therein, a monomer mixture composed of 2 parts of ethyl acrylate, 2 parts of methyl methacrylate and 16 parts of 2-isopropenyl-2-oxazoline and prepared beforehand was added dropwise through a dropping funnel during 1 hour. In the course of reaction, the nitrogen gas was run continuously and the temperature in the flask was maintained at 60±1° C. After the dropping finished, the same temperature was kept for 9 hours and then, by cooling there was obtained an aqueous solution of an 2-oxazoline group-containing polymer having 10.4% of non-volatile and showing pH 6.5 and the viscosity of 13.5 cP. Residual 2-isopropenyl-2-oxazoline was 148 ppm. A strong absorption was observed at 1655.2 cm$^{-1}$ in FT-IR measurement of the obtained polymer.

EXAMPLE 2

(Productive Example of an Oxazoline Group-Containing Water-Soluble Polymer)

The procedure of example 1 was repeated except that a monomer mixture composed of 1 part of ethyl acrylate, 1 part of methyl methacrylate and 18 parts of 2-isopropenyl-2-oxazoline was used, whereby an aqueous solution of a 2-oxazoline group-containing polymer having 10.5% of non-volatile component and showing pH 7.4 and viscosity of 12.5 cP was obtained. Residual 2-isopropenyl-2-oxazoline was 155 ppm. The FT-IR measurement of the obtained polymer showed strong absorption at 1656.5 cm$^{-1}$.

EXAMPLE 3

(Productive Example of an Oxazoline Group-Containing Water-Soluble Polymer)

The procedure of example 1 was repeated except that a monomer mixture composed of 4 parts of ethyl acrylate and 16 parts of 2-isopropenyl-2-oxazoline was used, whereby an aqueous solution of a 2-oxazoline group-containing polymer having 10.5% of non-volatile component and showing pH 6.8 and viscosity of 10.5 cP was obtained. Residual 2-isopropenyl-2-oxazoline was 134 ppm. The FT-IR absorption spectrum of the obtained polymer showed strong absorption at 1655.1 cm$^{-1}$.

COMPARATIVE EXAMPLE 1

(Comparative Productive Example of an Oxazoline Group-Containing Water-Soluble Polymer)

The procedure of example 1 was repeated except that 20 parts of 2-isopropenyl-2-oxazoline instead of a monomer mixture was used, whereby an aqueous solution of a 2-oxazoline group-containing polymer having 10.4% of a non-volatile component and showing pH 8.3 and viscosity of 13.5 cP was obtained. Residual 2-isopropenyl-2-oxazoline was 340 ppm.

COMPARATIVE EXAMPLE 2

(Comparative Productive Example of an Oxazoline Group-Containing Water-Soluble Polymer)

The procedure of example 1 was repeated except that a monomer mixture composed of 4 parts of methyl methacrylate and 16 parts of 2-isopropenyl-2-oxazoline was used, whereby an aqueous solution of an 2-oxazoline group-containing polymer having 10.3% of a non-volatile component and showing pH 6.8 and viscosity of 341 cP was obtained. Residual 2-isopropenyl-2-oxazoline was 420 ppm.

EXAMPLE 4

(Productive Example of an Oxazoline Group-Containing Water-Soluble Polymer

The procedure of example 1 was repeated except that a monomer mixture composed of 1 part of ethyl acrylate, 4 parts of 2-isopropenyl-2-oxazoline and 15 parts of methoxypolyethylene glycol methacrylate having 23 ethylene glycol units on the average (NK ester M-230G made by Shinnakamura Chemical Industrial, Co., Ltd.) was used, whereby an aqueous solution of a 2-oxazoline group-containing polymer having 10.4% of a non-volatile component and showing pH 7.1 and the viscosity of 10 cP was obtained. Residual 2-isopropenyl-2-oxazoline was 69 ppm. The FT-IR absorption spectrum of the obtained polymer showed strong absorption at 1656.2 cm$^{-1}$.

COMPARATIVE EXAMPLE 3

(Comparative Productive Example of an Oxazoline Group-Containing Water-Soluble Polymer)

The procedure of example 1 was repeated except that a monomer mixture composed of 4 parts of 2-isopropenyl-2-oxazoline and 16 parts of methoxypolyethylene glycol methacrylate (NK ester M-230G made by Shinnakamura Chemical Industrial, Co., Ltd.) was used, whereby an aqueous solution of a 2-oxazoline group-containing polymer having 10.3% of a non-volatile component and showing pH 7.5 and viscosity of 10.5 cP was obtained. Residual 2-isopropenyl-2-oxazoline was 107 ppm.

EXAMPLE 5

(Productive Example of an Oxazoline Group-Containing Water-Soluble Polymer)

Into the same flask as Example 1, were charged 116 parts of deionized water and 4 parts of V-50 and the obtained mixture was heated to 70° C. with introducing nitrogen gas slowly. Therein, a previously prepared monomer mixture composed of 64 parts of methoxypolyethylene glycol acrylate (on the average, ethylene glycol nonamer; NK ester Am-90G made by Shinnakamura Chemical Industrial, Co., Ltd.) and 16 parts of 2-isopropenyl-2-oxazoline was added dropwise through a dropping funnel during 1 hour. In the course of reaction, the nitrogen gas was run continuously and the temperature in the flask was maintained at 70 ±1° C. After the dropping finished, the same temperature was kept for 9 hours and then, by cooling there was obtained aqueous solution of a 2-oxazoline group-containing polymer having 41.5% of non-volatile component and showing pH 6.5 and viscosity of 67 cP. Residual 2-isopropenyl-2-oxazoline was less than 10 ppm. A strong absorption was observed at 1656.1 cm$^{-1}$ in FT-IR measurement of the obtained polymer.

EXAMPLE 6

(Productive Example of an Oxazoline Group-Containing Water-Soluble Polymer)

The procedure of example 5 was repeated except that a monomer mixture composed of 4 parts of methoxypolyethylene glycol acrylate (NK ester AM-90G made by Shinnakamura Chemical Industries, Co., Ltd.), 60 parts of methoxypolyethylene glycol methacrylate (on the average, ethylene glycol nonamer; NK ester M-90G made by Shinnakamura Chemical Industrial, Co., Ltd.) and 16 parts of 2-isopropenyl-2-oxazoline was used an aqueous solution of an 2-oxazoline group-containing polymer having 42.3% of non-volatile and showing pH 7.6 and the viscosity of 103 cP was obtained. Residual 2-isopropenyl-2-oxazoline was 108 ppm. The absorption spectrum of the obtained polymer showed strong absorption at 1655.6 cm$^{-1}$.

COMPARATIVE EXAMPLE 4

(Comparative Productive Example of an Oxazoline Group-Containing Water-Soluble Polymer)

The procedure of example 5 was repeated except that a monomer mixture composed of 64 parts of methoxypolyethylene glycol methacrylate (NK ester M-90G made by Shinnakamura Chemical Industrial, Co., Ltd.) and 16 parts of 2-isopropenyl-2-oxazoline was used, whereby an aqueous solution of an 2-oxazoline group-containing polymer having 42.3% of non-volatile and showing pH 8.1 and viscosity of 99 cP was obtained. Residual 2-isopropenyl-2-oxazoline was 120 ppm.

EXAMPLE 7

(Productive Example of an Oxazoline Group-Containing Water-Soluble Polymer)

The procedure of example 5 was repeated except that a mixture of 58 parts of deionized water and 58 parts of isopropanol instead of 116 parts of deionized water charged in a flask and a monomer mixture composed of 32 parts of methoxypolyethylene glycol acrylate (NK ester AM-90G made by Shinnakamura Chemical Industrial Co., Ltd.), 32 parts of methyl methacrylate and 16 parts of 2-isopropenyl-2-oxazoline were used, whereby an aqueous solution of an 2-oxazoline group-containing polymer having 41.6% of non-volatile and showing pH 6.7 and viscosity of 360 cP was obtained. Residual 2-isopropenyl-2-oxazoline was 82 ppm. The absorption spectrum of the obtained polymer showed strong absorption at 1656.3 cm$^{-1}$.

COMPARATIVE EXAMPLE 5

(Comparative Productive Example of an Oxazoline Group-Containing Water-Soluble Polymer)

The procedure of example 7 was repeated except that a monomer mixture composed of 32 parts of methoxypolyethylene glycol methacrylate (NK ester M-230G made by Shinnakamura Chemical Industrial, Co., Ltd.), 32 parts of methyl methacrylate and 16 parts of 2-isopropenyl-2-oxazoline was used, whereby an aqueous solution of an 2-oxazoline group-containing polymer having 41.2% of non-volatile and showing pH 6.6 and viscosity of 850 cP was obtained. Residual 2-isopropenyl-2-oxazoline was 750 ppm.

The weight-average molecular weights of polymers obtained from the examples and comparative examples were determined by gel permeation chromatography (GPC) carried out under the undermentioned conditions. The molecular weight calibration curve was obtained by commercially-available standard polyethylene glycol and polyethylene oxide.

GPC CONDITIONS

Column: TSKgel G-2500, 3000, 4,000 and 5000 PW$_{XL}$ (made by Tosoh Co., Ltd.)
Eluent: a mixed solution of acetonitrile and a 50 mM aqueous sodium chloride solution in a 20 to 80 ratio by volume.
Flow rate: 1.0 ml/min Temperature: 40° C.
Sample concentration: 0.1%
Sample size: 300 μl
Detector: a differential refractive index detector Results from examples 1 to 7 and comparative examples 1 to 5 were summarized in Table 1.

polymer of example 7, in which the acrylic ester (b) was copolymerized, was reduced compared with that in the polymer of comparative example 5.

As clearly seen from results in the examples and comparative examples, if an acrylic ester is copolymerized in a polymerization reaction process of the addition-

TABLE 1

| | Composition of monomer mixture (%) | | | Properties of an aqueous solution of 2-oxazoline group-containing polymer | | | | | |
|---|---|---|---|---|---|---|---|---|---|
| | Addition-polymerizable oxazoline (a) | Acrylic ester (b) | Other monomer (c) | Non-volatile (%) | pH | Viscosity (cps) | Residual oxazoline monomer (ppm) | IR peak of polymer (cm$^{-1}$) | Weight-average molecular weight of polymer |
| Example 1 | IPO (80) | EA (10) | MMA (10) | 10.4 | 6.5 | 13.5 | 148 | 1655.2 | 29,500 |
| Example 2 | IPO (90) | EA (5) | MMA (5) | 10.5 | 7.4 | 12.5 | 155 | 1656.5 | 29,100 |
| Example 3 | IPO (80) | EA (20) | — | 10.5 | 6.8 | 10.5 | 134 | 1655.1 | 32,500 |
| Comparative example 1 | IPO (100) | — | — | 10.4 | 8.3 | 13.5 | 340 | — | 26,800 |
| Comparative example 2 | IPO (80) | — | MMA (20) | 10.3 | 6.8 | 341 | 420 | — | 23,800 |
| Example 4 | IPO (20) | EA (5) | M-230G (75) | 10.4 | 7.1 | 10.0 | 69 | 1656.2 | 36,100 |
| Comparative example 3 | IPO (20) | — | M-230G (80) | 10.3 | 7.5 | 10.5 | 107 | — | 34,200 |
| Example 5 | IPO (20) | AM-90G (80) | — | 41.5 | 6.5 | 67.0 | <10 | 1656.1 | 15,200 |
| Example 6 | IPO (20) | AM-90G (5) | M-90G (75) | 42.3 | 7.6 | 103 | 108 | 1655.6 | 13,100 |
| Comparative example 4 | IPO (20) | — | M-90G (80) | 42.3 | 8.1 | 99 | 120 | — | 11,900 |
| Example 7 | IPO (20) | AM-90G (40) | MMA (40) | 41.6 | 6.7 | 360 | 82 | 1656.3 | 1,500 |
| Comparative example 5 | IPO (20) | — | MMA (40) M-230G (40) | 41.2 | 6.6 | 850 | 750 | — | 1,500 |

Footnote:
IPO: 2-isopropenyl-2-oxazoline, EA: ethyl acrylate, MMA: methyl methacrylate, AM-90G: methoxypolyethylene glycol acrylate, M-90G: methoxypolyethylene glycol methacrylate, M-230G: methoxypolyethylene glycol methacrylate.

The undermentioned is seen from the results shown in Table 1.

when the examples 1 to 3 and comparative examples 1 and 2 produced with an amount of the addition-polymerizable oxazoline (a) in a range of 80 to 100% and under all the same polymerization conditions are compared one another, it is clear that the amounts of residual oxazoline monomers in the water-soluble polymers of examples 1 to 3, in which small amounts of the acrylic ester (b) were copolymerized, were reduced compared with those in the polymers of comparative examples 1 to 2.

When the example 4 and comparative example 3 produced with a 20% amount of the addition-polymerizable oxazoline (a) and under all the same polymerization conditions are compared one another, it is clear that the amount of residual oxazoline monomers in the water-soluble polymers of example 4, in which a small amount of the acrylic ester (b) was copolymerized, was reduced compared with that in the polymer of comparative example 3.

When the examples 5 and 6 and comparative example 4 produced with a 20% amount of the addition-polymerizable oxazoline (a) and under all the same polymerization conditions are compared one another, it is clear that the amount of residual oxazoline monomers in the water-soluble polymer of example 6, in which a small amount of the acrylic ester (b) was copolymerized, was reduced compared with that in the polymer of comparative example 4, and the amount of residual oxazoline monomers in the example 5, in which the amount of the acrylic ester (b) to be copolymerized was further increased, was further reduced.

When the example 7 and comparative example 5 produced with a 20% amount of the addition-polymerizable oxazoline (a) and under all the same polymerization conditions are compared, it is clear that the amount of residual oxazoline monomers in the water-soluble polymerizable oxazoline, an oxazoline group-containing water-soluble polymer in which an residual amount of the oxazoline monomer is small is produced compared with a case where the acrylic ester is not copolymerized.

What is claimed is:

1. A process for producing a water-soluble polymer containing a 2-oxazoline group, comprising polymerizing a monomer component containing an addition-polymerizable oxazoline;

the process being characterized by that said monomer component further contains an acrylic ester and said monomer component is polymerized in an aqueous medium, said monomer component comprising a monomer mixture comprising 5 to 95.25% by weight of a an addition-polymerizable oxazoline (a); 0.25 to 95.0% by weight of an acrylic ester (b); 0 to 94.75% by weight of a monomer (c) which is not an addition-polymerizable oxazoline or an acrylic ester; and said monomer mixture containing a hydrophilic monomer in an amount of 50% by weight or more.

2. A water-soluble polymer containing a pendant oxazoline group and a pendant polyethylene glycol chain, said polymer being obtained by polymerizing a monomer mixture composed of: 1 to 50% by weight of an addition-polymerizable oxazoline; 40 to 99% by weight of an unsubstituted or alkoxy group-substituted polyethylene glycol acrylate; and 0 to 59% by weight of a monomer which is not an addition-polymerizable oxazoline or an unsubstituted or alkoxy group-substituted polyethylene glycol acrylate; said monomer mixture containing a hydrophilic monomer in an amount of 50% by weight or more.

3. A water-soluble polymer containing a pendant oxazoline group and a pendant polyethylene glycol chain, said polymer being obtained by polymerizing a monomer mixture composed of: 1 to 50% by weight of an addition-polymerizable oxazoline; 40 to 98% by weight of an unsubstituted or alkoxy group-substituted polyethylene glycol methacrylate; 1 to 59% by weight of an acrylic ester; and 0 to 58% by weight of a monomer which is not an addition-polymerizable oxazoline, an unsubstituted or alkoxy group-substituted polyethylene glycol methacrylate or an acrylic ester; said monomer mixture containing a hydrophilic monomer in an amount of 50% by weight of more.

* * * * *